United States Patent [19]
Carobolante

[11] Patent Number: 6,084,378
[45] Date of Patent: Jul. 4, 2000

[54] VARIABLE SLEW RATE PULSE WIDTH MODULATION SYSTEM

[75] Inventor: Francesco Carobolante, Scotts Valley, Calif.

[73] Assignee: STMicroelectronics, Inc., Carrollton, Tex.

[21] Appl. No.: 08/865,643

[22] Filed: May 30, 1997

[51] Int. Cl.[7] .................................................. H02P 5/28
[52] U.S. Cl. .................................... 318/811; 318/439
[58] Field of Search .................................. 312/254, 439, 312/138, 432, 792–817; 327/140

[56] References Cited

U.S. PATENT DOCUMENTS

| | | | |
|---|---|---|---|
| 4,743,815 | 5/1988 | Gee et al. | 318/254 |
| 5,153,492 | 10/1992 | Landseadel | 318/599 |
| 5,157,351 | 10/1992 | Carobolante | 330/277 |
| 5,309,078 | 5/1994 | Cameron | 318/811 |
| 5,365,422 | 11/1994 | Close et al. | 363/98 |
| 5,397,967 | 3/1995 | Carobolante et al. | 318/254 |
| 5,493,189 | 2/1996 | Ling et al. | 318/254 |
| 5,550,446 | 8/1996 | Schlager et al. | 318/439 |
| 5,589,744 | 12/1996 | Brambilla | 318/254 |
| 5,614,797 | 3/1997 | Carobolante | 318/432 |
| 5,633,791 | 5/1997 | Poon et al. | 363/56 |
| 5,668,449 | 9/1997 | Carobolante | 318/254 |
| 5,780,986 | 7/1998 | Shelton et al. | 318/432 |

FOREIGN PATENT DOCUMENTS 0 441 459 A1   8/1991   European Pat. Off. .

*Primary Examiner*—Jonathan Salata
*Attorney, Agent, or Firm*—David V. Carlson; Theodore E. Galanthay; Lisa K. Jorgenson

[57] ABSTRACT

A method and a circuit for controlling a slew rate of a coil in a voice coil motor in a disk drive system. A slew rate control signal is generated by a microprocessor or by an analog circuit in response to one or more operating parameters of the disk drive system. A driver circuit selectively couples the coil between a voltage source and a ground in response to a driver signal, and controls the slew rate of the coil in response to the slew rate control signal.

35 Claims, 8 Drawing Sheets

VARIABLE SLEW RATE PULSE WIDTH MODULATION SYSTEM

TECHNICAL FIELD

This invention relates to the operation of an inductive motor, and more particularly, to a circuit for controlling the slew rate of a voice coil motor driven by a pulse width modulation (PWM) signal.

BACKGROUND OF THE INVENTION

Voice coil motors are widely used in computer disk drive systems to position a read head over a storage medium. A conventional voice coil motor includes a single coil connected between two pairs of driving transistors in an H-bridge circuit configuration. The coil is situated inside a permanent magnet and is connected to the driving transistors by a plurality of flex cables. The coil is free to move inside the magnet subject to a minimal amount of damping and friction from the flex cables. The coil is accelerated in a forward direction by driving current through the coil in a forward direction, and the coil accelerates according to the amount of current driven through it. The coil will maintain momentum in the forward direction until a current is driven through the coil in a reverse direction resulting in a negative acceleration. The coil will slow and stop according to the amount of current driven through it in the reverse direction, and a further application of current will accelerate the coil in the reverse direction.

The driving transistors in the H-bridge circuit are selectively energized to drive current into the coil to accelerate the coil. An arm is attached to the coil, and a read head is fixed to an end of the arm and is moved backwards and forwards in a linear path by the coil. The storage medium is typically a rotating disk with a magnetic surface having a plurality of concentric tracks in which digital data is stored. The read head is positioned by the coil over a track to read data in the track or to write data to the track. When the read head is not being used to access data on the disk, it is held in a stationary rest position over an area of the disk which is separated from the tracks.

Each end of the coil is connected between a high side driving transistor and a low side driving transistor in the H-bridge circuit. Typically, each of the driving transistors in a voice coil motor is an N channel double-diffused metal-oxide semiconductor (DMOS) transistor having a gate, a drain and a source. The driving transistor is rendered conductive, or is switched on, when a gate voltage applied to its gate exceeds a source voltage at the source of the driving transistor by a threshold voltage. As the driving transistor is switched on, a current begins to flow through the transistor from the drain to the source. Typically, the gate voltage is raised to two or three times the level of the threshold voltage above the source voltage. The driving transistor presents a resistance to the source-drain current which reduces as the gate voltage increases. When the gate voltage reaches a maximum, the driving transistor is in a saturated state and presents very little resistance to the source-drain. Conversely, the driving transistor is rendered non-conductive, or is switched off, by reducing the gate voltage until the resistance increases sufficiently to stop the current between the drain and the source. The coil is connected at each end between a high side driving transistor and a low side driving transistor.

In the H-bridge circuit current is directed through the coil by switching on a high side driving transistor on one side of the coil and a low side driving transistor on the other side of the coil to connect the coil between a voltage source and a ground. Current travels from the voltage source, through the high side driving transistor, the coil, the low side driving transistor, and then to the ground. At each end of the coil the voltage rises as the high side and low side driving transistors are switched on. Conversely, the voltage at either end of the coil falls to the ground after the driving transistors have been switched off. Any change in the voltage in the coil will include transient voltage spikes caused by a reaction of the coil against the change. The voltage at each end of the coil changes at a rate, called a slew rate, which is related to the rate at which the adjacent driving transistor is switched on or off by its gate voltage. The slew rate increases with an increase in the rate of change of the gate voltage of the adjacent driving transistor, and decreases with a reduction in the rate of change of the gate voltage.

The coil may be driven by a linear current or a pulse width modulated (PWM) current. A linear current is a constant current driven through the coil by switching on each appropriate driving transistor with a linear gate voltage signal so that the driving transistors provide a substantial resistance to the source-drain current. The linear gate voltage signals are used to regulate the current in the coil by increasing or decreasing the resistance of the driving transistors. The coil accelerates forward according to the amount of linear current driven into it in a forward direction. The coil is stopped or accelerated in a reverse direction according to the amount of linear current driven through it in the reverse direction.

The PWM current is generated in the coil by applying a PWM gate voltage signal to the gates of the appropriate driving transistors. The driving transistors are switched on and off by the PWM gate voltage signal. The PWM gate voltage signal is a series of voltage pulses in which each voltage pulse raises the gate voltage rapidly to a high voltage level which is held for a first selected time period. At the end of the first selected time period the gate voltage declines rapidly to a low voltage level that is held for a second selected time period. The ratio of the first selected time period to the total time period made up of the first and second selected time periods is known as the duty cycle of the PWM gate voltage signal. The PWM gate voltage signal switches on the driving transistors with a gate voltage sufficient to put the driving transistors in a saturated state such that they present a minimal resistance to current.

The PWM current may be induced in the coil in the forward direction by applying a PWM gate voltage signal to the appropriate high side and low side driving transistors. The PWM current will fluctuate or produce a ripple around an average value of current in the forward direction, the ripple resulting from the pulses in the PWM gate voltage signal. The average value of the forward PWM current in the coil is proportional to the duty cycle of the PWM gate voltage signal. The PWM current may be induced in the coil in the reverse direction by applying the PWM gate voltage signal to an opposing pair of high side and low side driving transistors. The coil is accelerated in a forward direction according to an average forward PWM current in the coil which is determined by the duty cycle of the PWM gate voltage signal. The coil is slowed or accelerated in a reverse direction according to an average reverse PWM current in the coil which is determined by the duty cycle of the PWM gate voltage signal.

The coil may be driven with a PWM gate voltage signal during a portion of its movement and by a linear gate voltage signal during a subsequent motion. The linear gate voltage signal may be used to precisely control the motion of the coil, but a drawback of the use of a linear gate voltage signal is that a significant amount of power is dissipated by the resistance of the driving transistors. An advantage of a PWM gate voltage signal is that the driving transistors dissipate much less power when driving the PWM current through the coil. However, the PWM gate voltage signal generates a significant amount of electromagnetic interference (EMI), or noise, which may interfere with a transmission of data in a read/write channel linking the read head with a disk drive system. The noise is generated by abrupt changes in current in the coil as well as fast voltage transients. The PWM gate voltage signal pulses have sharp edges and steep inclines which drive the coil and supply wiring as an antenna to generate the noise. One way of reducing the noise generated by driving a PWM current in the coil is to reduce the slew rate at each end of the coil because the current in the coil is directly related to the voltage in the coil. A reduction in the rate of change of voltage at each end of the coil reduces the rate of change of current in the coil. Reducing the slew rate also increases the amount of power dissipated by the driving transistors.

As described above, the coil in the voice coil motor moves the read head across the rotating disk to read data from or write data to an appropriate track on the disk. When the read head is not accessing data on the disk, it is parked in a rest position a substantial distance from the tracks. The movement of the read head takes place in two phases, a seek phase and a track and follow phase. In the seek phase, the read head is moved rapidly over a substantial portion of the disk from the rest position (or a previous track) to the neighborhood of a selected track. A substantial amount of current is applied to accelerate the read head toward the selected track. After the read head has traveled for a predetermined distance, a substantial current is applied in the reverse direction to slow the coil until the read head is positioned over the track. In the track and follow phase, a small amount of current is applied to move the coil to position and maintain the read head over the selected track. The tracks can be slightly eccentric around the center of the rotating disk and the read head must be moved to follow them.

In some recent disk drive systems, a PWM current is applied to accelerate and decelerate the coil in the seek phase to minimize power dissipation, while a linear current is applied to the coil in the track and follow phase. Because only a small amount of current through the coil is needed in the track and follow phase, a linear current can be used to drive the coil without significant power dissipation.

The position of the read head is determined by a control logic unit in the disk drive system from two sources of information. The read head itself reads position data from the rotating disk as it travels over the disk to the selected track and transmits this data to the control logic unit. In addition, the control logic unit retains in a memory preassigned velocity profiles to achieve a desired track position. The control logic unit senses the track position and the amount of current in the coil to determine the acceleration of the coil, and then compares this information with the velocity profiles stored in the memory to optimize the position of the coil.

The noise generated by the disk drive system is quantified by a signal-to-noise ratio (SNR) which is a ratio of the average power of a data signal being transmitted by the read head to the average power of the noise. When the read head is transmitting data to or from the disk in the track and follow phase, the SNR must be maximized to ensure that the data is not lost in the transmission. However, when the read head is reading position data from the rotating disk in the seek phase, a lower SNR is tolerable because missed data points may be interpolated from surrounding data points. In addition, the position of the read head is also determined from the current in the coil. Therefore, in modern disk drive systems the coil may be moved with a PWM current in the seek phase and with a linear current in the track and follow phase. However, the provision of both a PWM current and a linear current to drive the coil requires two distinct circuit loops in the disk drive system which is expensive.

SUMMARY OF THE INVENTION

A preferred embodiment of the present invention is directed to an adaptive slew rate control circuit for controlling a slew rate of an inductive load. The control circuit includes a slew rate control circuit producing a slew rate control signal based on one or more operating parameters of a system that includes the inductive load and a driver circuit connected between a voltage supply and a reference voltage which has an input terminal. The driver circuit is coupled to the inductive load and selectively couples the inductive load to the voltage supply in response to a driver signal received at the input terminal and receives the slew rate control signal from the slew rate control circuit to control the slew rate of a voltage on the inductive load in response to the slew rate control signal.

Another preferred embodiment of the present invention is directed to a method for controlling a slew rate of an inductive load. The method includes providing a driving signal and a slew rate control signal. The method selectively couples the inductive load to a reference voltage in response to the driving signal to adjust a current in the inductive load. The slew rate control signal is used to govern a rate at which the inductive load is coupled to the reference voltage and thereby control the slew rate of a voltage on the inductive load.

DETAILED DESCRIPTION OF THE INVENTION

Figure 1:
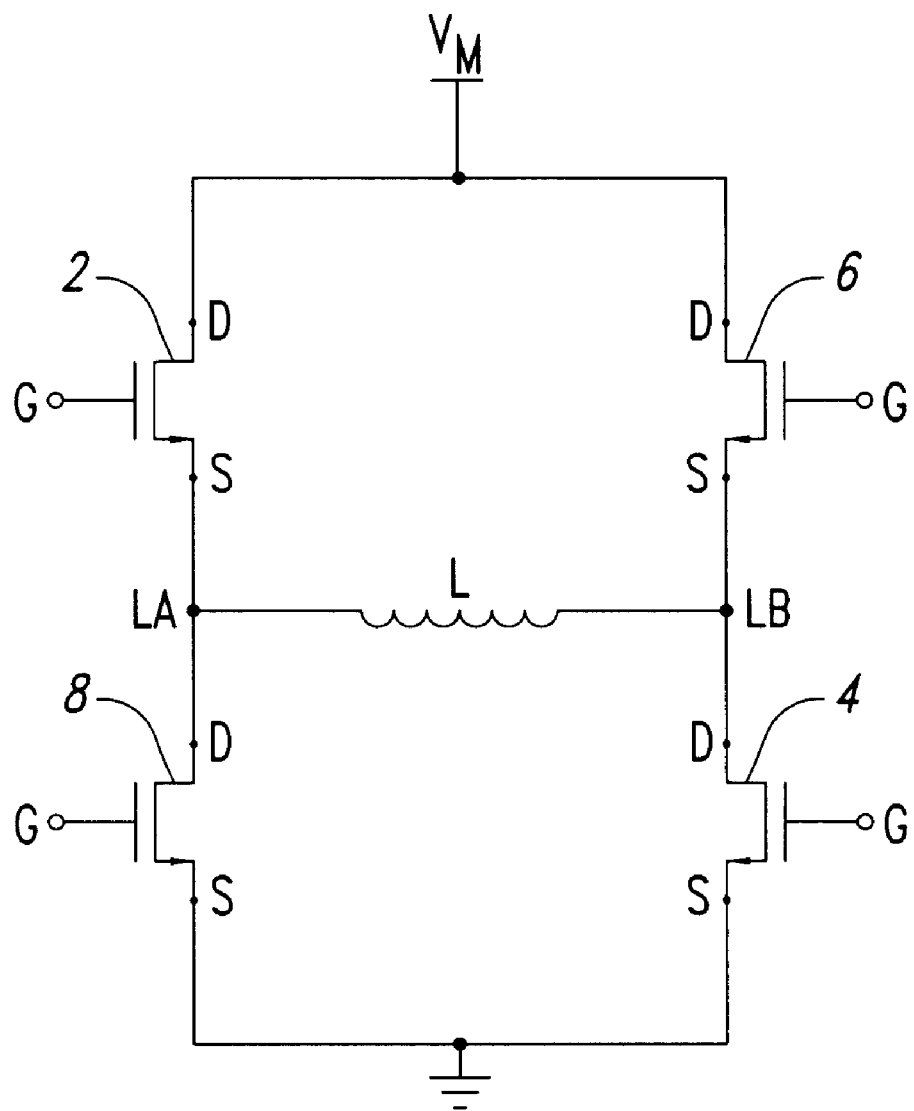
FIG. 1 is a schematic diagram of an inductive load connected in an H-bridge circuit according to the prior art.

A conventional H-bridge circuit for driving a coil or an inductive load L in a voice coil motor is shown schematically in FIG. 1. The coil L is driven by two pairs of N-channel DMOS driving transistors: the first pair having a first high side driving transistor 2 and a first low side driving transistor 4 and the second pair having a second high side driving transistor 6 and a second low side driving transistor 8. One end, denoted as LA, of the coil L is connected to a source S of the first high side driving transistor 2 and to a drain D of the second low side driving transistor 8. A second end, denoted as LB, of the coil L is similarly connected to a source S of the second high side driving transistor 6 and to a drain D of the first low side driving transistor 4. The drains D of each of the high side driving transistors 2, 6 are connected to a voltage source $V_M$ and the sources S of each of the low side driving transistors 4, 8 are connected to a ground. Each of the driving transistors 2, 4, 6 and 8 include a gate G in addition to the drain D and source S discussed above.

Each of the driving transistors 2–8 is switched on by raising a gate voltage applied to its gate G to a level exceeding the voltage at its source S by at least a threshold voltage. The gate voltage is usually raised further to a maximum level of two or three times the threshold voltage in excess of the source voltage to put the driving transistor in a saturated state which provides a minimum of resistance to current from the drain D to the source S. The rate of change of a voltage at the connection between the driving transistor and the coil L (i.e., the slew rate of the driving transistor) is governed by the rate of change of the gate voltage.

In the conventional H-bridge circuit shown in FIG. 1, the driving transistors 2–8 are selectively switched on and off to direct current through the coil L in either a forward direction or a reverse direction. For example, when the driving transistors 2, 4 are switched on, current flows in a forward direction from the voltage source $V_M$ through the first high side driving transistor 2, the coil L, and the first low side driving transistor 4 to the ground. A reverse current can be driven through the coil L by switching off the driving transistors 2, 4 and switching on the driving transistors 6, 8. In this instance, current will flow from the voltage source $V_M$ through the second high side driving transistor 6, the coil L, and the second low side driving transistor 8 to the ground.

As described above, the coil L is moved in a forward direction by driving current through the coil L in the forward direction. The coil L is accelerated according to the amount of current driven in the forward direction, and may be slowed and stopped by a current driven in the reverse direction through the coil L. A selective application of current in the forward and reverse directions controls the position of the coil L in the voice coil motor.

One method of driving the coil L with a PWM current is to apply a first PWM gate voltage signal to the first high side driving transistor 2 and a second PWM gate voltage signal to the second high side driving transistor 6. This is known as a phase shift method of driving the coil L. The first and second PWM gate voltage signals are coincident such that when both have a 50% duty cycle, the first and second PWM gate voltage signals are identical in phase and pulse duration, and cancel each other. A PWM current is driven through the coil L by increasing the duty cycle of one of the PWM gate voltage signals while simultaneously decreasing the duty cycle of the other PWM gate voltage signal. The first PWM gate voltage signal is inverted and applied to the gate of the second low side driving transistor 8 and the second PWM gate voltage signal is inverted and applied to the gate of the first low side driving transistor 4 to provide a path for the PWM current in the coil L.

The phase shift method drives the PWM current in the coil L in the following manner. When the duty cycles of the first and second PWM gate voltage signals are 50%, then the high side driving transistors 2, 6 are switched on at the same time and the low side driving transistors 4, 8 are also switched on at the same time. No voltage differential exists across the coil L and therefore no current flows in the coil L. A PWM current is induced in the coil L in the forward direction by increasing the duty cycle of the first PWM gate voltage signal to, for example, 60%, and simultaneously decreasing the duty cycle of the second PWM gate voltage signal by an equivalent portion to, for example, 40%. The PWM current fluctuates or ripples around an average value. The average value of the PWM current in the coil L is determined by the difference between the duty cycles of the first and second PWM gate voltage signals. A PWM current may be driven in a reverse direction through the coil L by increasing the duty cycle of the second PWM gate voltage signal and decreasing the duty cycle of the first PWM gate voltage signal.

The coil L is accelerated according to the average PWM current in the coil. The coil L may be accelerated in a forward direction by driving a PWM current through it in the forward direction. The coil L may be slowed or stopped by driving a PWM current through it in the reverse direction. The PWM gate voltage signals have sharp edges and steep inclines which, along with the rippling PWM current, drive the coil L and its associated supply wiring as an antenna, resulting in a substantial amount of EMI or noise. The EMI interferes with signals transmitted by the read head over a read/write channel, and may be reduced by limiting the slew rate of the voltage on the coil L.

Figure 2:
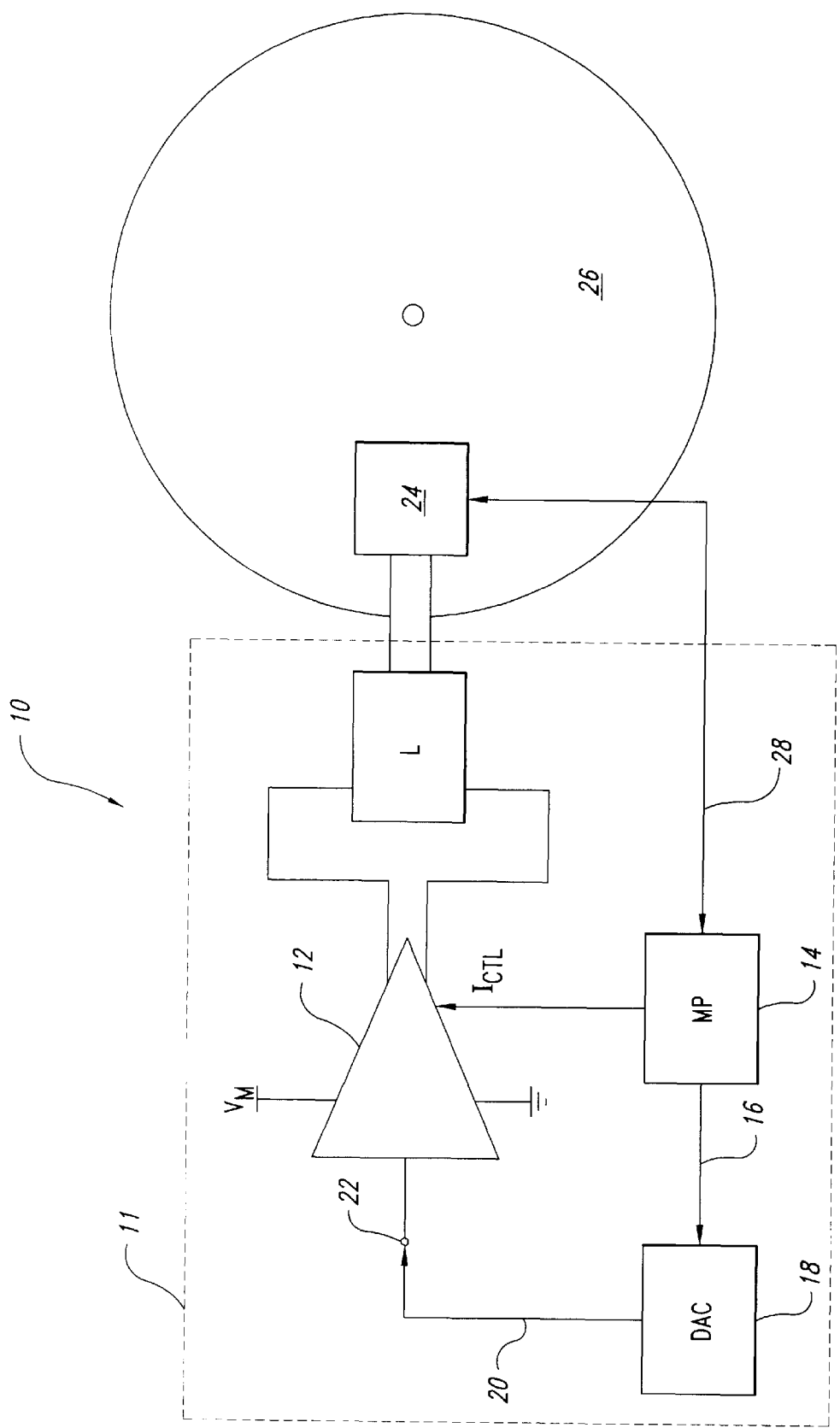
FIG. 2 is a schematic diagram of a system for driving an inductive load including a driver circuit controlling a slew rate of the inductive load according to a first embodiment of the invention.

A disk drive system 10 including a slew rate control circuit 11 for controlling the slew rate of a coil L in a voice coil motor according to a first embodiment of the invention is shown in FIG. 2. A driver circuit 12 is connected to each end of the coil L, and is connected between a voltage source $V_M$ and a ground. The driver circuit 12 controls the slew rate in the coil L by controlling the rate at which the ends of the coil are coupled to the voltage source $V_M$ and the ground.

The slew rate control circuit 11 includes a microprocessor 14 that transmits a slew rate control signal $I_{CTL}$, which is a current signal, to the driver circuit 12. The microprocessor 14 also transmits a digital control signal 16 to a digital-to-analog converter (DAC) 18. The DAC 18 converts the digital control signal 16 to an analog control signal 20 which is applied to an input terminal 22 of the driver circuit 12. The analog control signal 20 indicates to the driver circuit 12 the direction that current is to be driven in the coil L, or that no current is to be driven in the coil L.

The coil L is rigidly connected to a read head 24 which is positioned over a rotating disk 26. The read head 24 transmits a signal over a read/write channel 28 to the microprocessor 14. The signal transmitted by the read head 24 includes position data that indicates the position of the read head 24 with respect to the rotating disk 26.

The operation of the slew rate control circuit 11 shown in FIG. 2 will now be described. The microprocessor 14 controls the disk drive system 10 by, in part, controlling the motion of the coil L in the voice coil motor to position the read head 24 over the disk 26. The microprocessor 14 controls the driver circuit 12 with the slew rate control signal $I_{CTL}$ and the analog control signal 20. The driver circuit 12 is referenced to a voltage equal to half the voltage source $V_M$, or $V_M/2$. The microprocessor 14 generates the digital control signal 16 which is converted by the DAC 18 to the analog control signal 20 which is between the supply voltage $V_M$ and the ground. The driver circuit 12 drives a current through the coil L in a direction corresponding to the analog control signal 20. If the analog control signal 20 is greater than the voltage $V_M/2$, then the driver circuit 12 drives a PWM current through the coil in a forward direction. If the analog control signal 20 is less than the voltage $V_M/2$, then the driver circuit 12 drives a PWM current through the coil in a reverse direction. The coil L accelerates or decelerates in response to the current driven through it by the driver circuit 12 to position the read head 24 over the rotating disk 26.

The driver circuit 12 controls the rate of change of voltage at each end of the coil L (slew rate of the coil) according to the slew rate control signal $I_{CTL}$. The slew rate control signal $I_{CTL}$ is generated by the microprocessor 14 based on one or more operating parameters of the disk drive system 10. Several of the operating parameters serve as indicators of an appropriate slew rate as will be described with reference to the embodiments shown in FIGS. 3–7.

There are several factors involved in a selection of an appropriate slew rate. First, a high slew rate will generate a substantial amount of noise which will interfere with data transmission over the read/write channel 28. The noise is more tolerable in a seek phase of movement because the microprocessor 14 has access to several sources of information about the position of the read head 24. In a track and follow phase of movement noise must be minimized when data is transmitted over the read/write channel 28 so the slew rate may be reduced. Another factor considered is that a higher slew rate results in less power dissipation through the driving transistors. The slew rate is therefore maximized subject to the noise requirements of the read/write channel 28.

Figure 3:
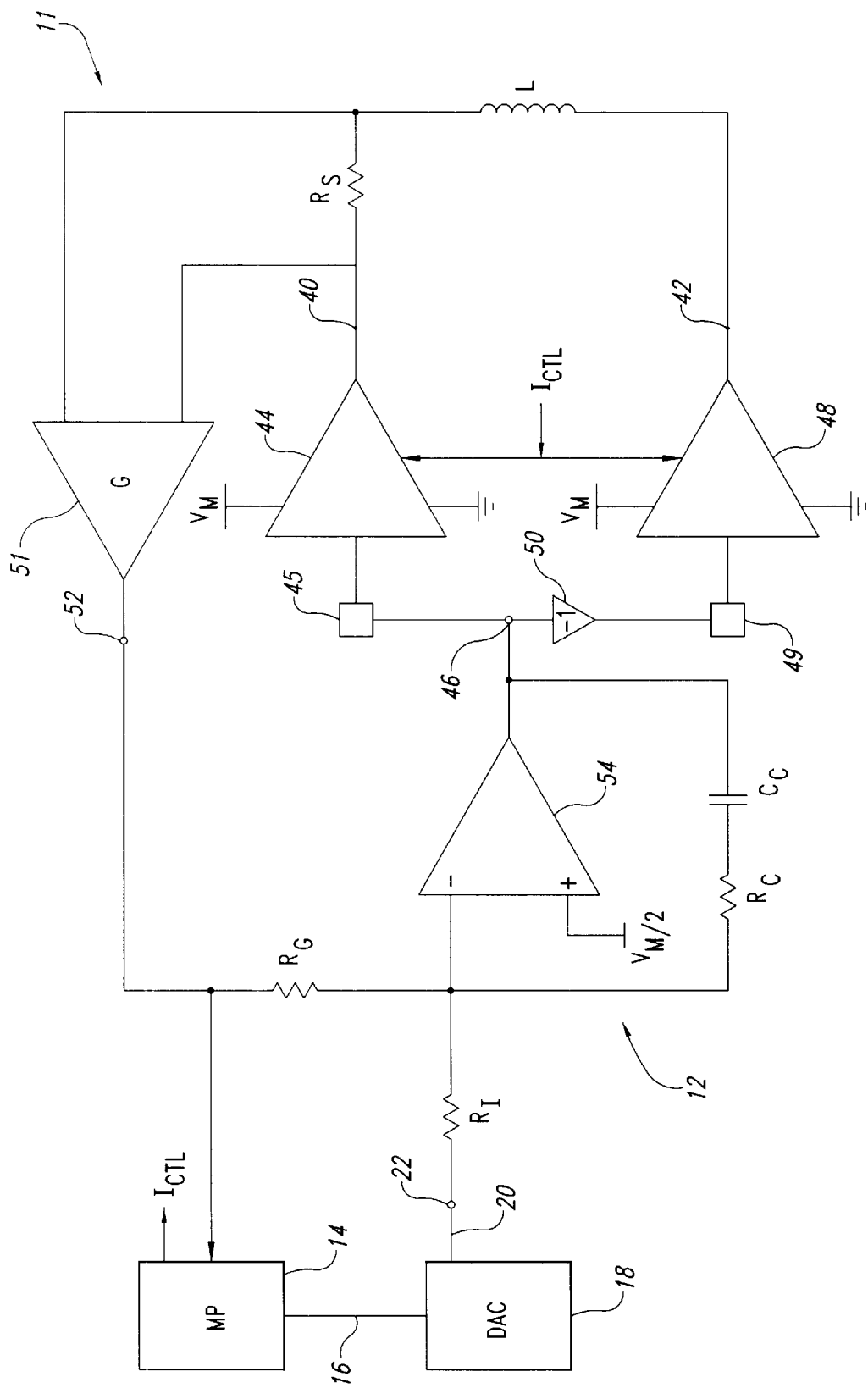
FIG. 3 is a schematic diagram of the system for driving an inductive load shown in FIG. 2.

A detailed schematic diagram of the slew rate control circuit 11 is shown in FIG 3. Elements common to the circuits shown in FIGS. 2 and 3 are given the same reference numerals.

The coil L is connected in series with a sense resistor $R_S$, such that the coil L and the sense resistor $R_S$ are connected between a first node 40 and a second node 42. The first node 40 is connected to an output of a first power amplifier 44. The first power amplifier 44 is connected between the voltage source $V_M$ and the ground and receives a first PWM signal from a first PWM converter 45. The first PWM converter 45 receives a driver signal from an input terminal 46. The first power amplifier 44 selectively couples the first node 40 to the voltage source $V_M$ or the ground in response to the first PWM signal. The second node 42 is connected to an output of a second power amplifier 48 which is connected between the voltage source $V_M$ and the ground. The second power amplifier 48 receives a second PWM signal from a second PWM converter 49. The second PWM converter 49 receives an inverted driver signal from an inverter 50 which inverts the driver signal from the input terminal 46 about the voltage $V_M/2$. The inverter 50 is an analog inverter constructed with an amplifier referenced to the voltage $V_M/2$ with a gain of –1. The second power amplifier 48 selectively couples the second node 42 to the voltage source $V_M$ or the ground in response to the second PWM signal.

The power amplifiers 44 and 48, which will be discussed in more detail in FIGS. 5A and 5B, respectively, are driven according to the phase shift method described above. The first PWM converter 45 converts the driver signal from the input terminal 46 into the first PWM signal which is a digital signal with a duty cycle corresponding to a difference between the driver signal and the voltage $V_M/2$. For example, if the driver signal equals the voltage $V_M/2$, the duty cycle will be 50%. If the driver signal exceeds the voltage $V_M/2$, the duty cycle will be greater than 50%, and if the driver signal is less than the voltage $V_M/2$ then the duty cycle will be less than 50%. The power amplifier 44 couples the first node 40 to the voltage source $V_M$ when the first PWM signal is high, and couples the first node 40 to the ground when the first PWM signal is low.

The inverter 50 inverts the driver signal from the input terminal 46 about the voltage $V_M/2$ to generate an inverted driver signal, and the second PWM converter 49 converts the inverted driver signal from the inverter 50 into the second PWM signal, which is a digital signal with a duty cycle that is determined in the following manner. If the inverted driver signal equals the voltage $V_M/2$, then the duty cycle will be 50%. If the inverted driver signal exceeds the voltage $V_M/2$, then the duty cycle will be greater than 50%, and if the inverted driver signal is less than the voltage $V_M/2$, then the duty cycle will be less than 50%. Since the inverted driver signal provided to the second PWM converter 49 is opposite to the driver signal, the duty cycle of the second PWM signal changes in opposition to the changes in the duty cycle of the first PWM signal. The power amplifier 48 couples the second node 42 to the voltage source $V_M$ when the second PWM signal is high, and couples the second 42 to the ground when the second PWM signal is low.

Both the first and second power amplifiers 44 and 48 receive the slew rate control signal $I_{CTL}$ generated by the microprocessor 14. The first power amplifier 44 couples the first node 40 to the voltage source $V_M$ or the ground at a rate responsive to the slew rate control signal $I_{CTL}$. Similarly, the second power amplifier 48 couples the second node 42 to the voltage source $V_M$ or the ground at a rate responsive to the slew rate control signal $I_{CTL}$.

A voltage drop across the sense resistor $R_S$ indicates the amount of current in the coil L, and the voltage drop is amplified by a differential sense amplifier 51. The differential sense amplifier 51 has two inputs, each input being connected to one end of the sense resistor $R_S$, and is referenced internally to the voltage $V_M/2$. The differential sense amplifier 51 has an output terminal 52 and generates a voltage signal on the terminal 52 which indicates the current in the coil L. The terminal 52 is connected to an input of the microprocessor 14 to deliver the voltage signal indicating the current in the coil L.

A summing amplifier 54 produces the driver signal at an output connected to the input terminal 46. The summing amplifier 54 has a non-inverting input connected to the voltage $V_M/2$ and an inverting input coupled to its output by a series connection of a resistor $R_C$ and a capacitor $C_C$. The combination of the resistor $R_C$ and the capacitor $C_C$ stabilizes the driver circuit 12. The inverting input of the summing amplifier 54 is coupled to the terminal 52 through a resistor $R_G$ to receive the voltage signal indicating the current in the coil L. The inverting input of the summing amplifier 54 is also coupled to the input terminal 22 through a resistor $R_I$. The summing amplifier 54 sums the voltage provided by the terminal 52 with the signal 20 to generate the driver signal.

The operation of the slew rate control circuit 11 shown in FIG. 3 will now be described. The summing amplifier 54 sums the analog control signal 20 with the voltage at the terminal 52 to generate the driver signal. The analog control signal 20 indicates the direction of the PWM current that is to be driven through the coil L. The voltage at the terminal 52 indicates the instantaneous current in the coil L. The driver signal at the input terminal 46 is a voltage proportional to a difference between the analog control signal 20 and the voltage at the terminal 52, and therefore may be considered to be an error signal indicating the deviation between the instantaneous current in the coil L and the current directed by the microprocessor 14.

The first and second power amplifiers 44 and 48 drive a PWM current in the coil L according to the driver signal at the input terminal 46. If the driver signal is greater than the voltage $V_M/2$, then the duty cycles of the first and second PWM signals will be such as to induce an average current in the coil L in the forward direction. The rate at which the first node 40 and the second node 42 are switched between the voltage source $V_M$ and the ground is governed by the slew rate control signal $I_{CTL}$. If the driver signal is less than the voltage $V_M/2$, then the duty cycles of the first and second PWM signals will be such as to induce an average current in the coil L in the reverse direction. Again, the rate at which the first node 40 and the second node 42 are switched between the voltage source $V_M$ and the ground is governed by the slew rate control signal $I_{CTL}$ as discussed in more detail below.

Figure 4A:
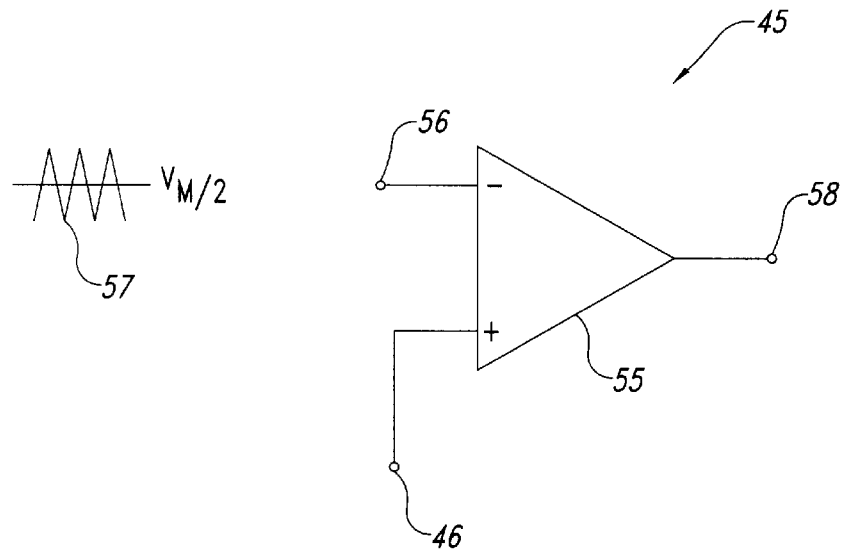
FIG. 4A is a schematic diagram of a PWM converter according to the first embodiment of the invention.

The PWM converters 45 and 49 may convert an analog voltage signal to a digital PWM signal according to any well-known method. An example of the first PWM converter 45 is shown in FIG. 4. The first PWM converter 45 includes a comparator 55 with a non-inverting input connected to the input terminal 46 to receive the driver signal and an inverting input connected to a terminal 56. A triangular wave signal 57 with an average voltage equal to the voltage $V_M/2$ is applied to the inverting input of the comparator 55 through the terminal 56. The comparator 55 provides the first PWM signal at an output terminal 58.

The first PWM converter 45 operates in the following manner. When the driver signal equals the voltage $V_M/2$ the comparator 55 generates the first PWM signal at the output terminal 58 with a duty cycle of 50%. If the driver signal is greater than the voltage $V_M/2$ the comparator 55 generates the first PWM signal at the output terminal 58 with a duty cycle greater than 50%. Conversely, if the driver signal is less than the voltage $V_M/2$ the comparator 55 generates the first PWM signal at the output terminal 58 with a duty cycle of less than 50%. The second PWM converter 49 may be arranged in a similar manner to convert the inverted driver signal into the second PWM signal.

Figure 4B:
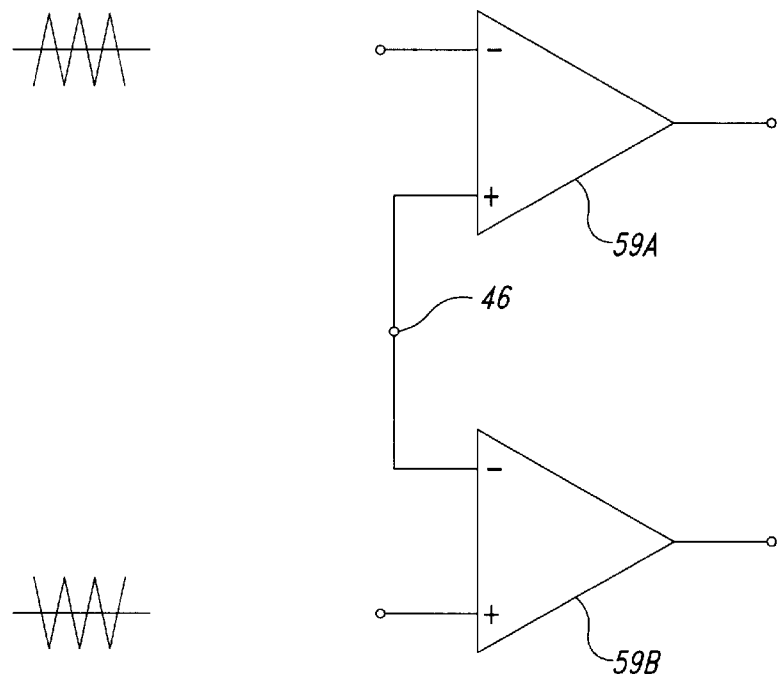
FIG. 4B is a schematic diagram of a PWM converter according to an alternative embodiment of the invention.

An alternative embodiment of a PWM converter is shown in FIG. 4B. The input terminal is connected to a non-inverting input of a first comparator 59A and to an inverting input of a second comparator 59B to deliver the driver signal. A first triangular wave signal is applied to an inverting input of the first comparator 59A. A second triangular wave, which is phase shifted 180 degrees from the first triangular wave, is applied to a non-inverting input of the second comparator 59B. The first comparator 59A generates the first PWM signal at an output, and the second comparator 59B generates the second PWM signal at an output.

Figure 5A:
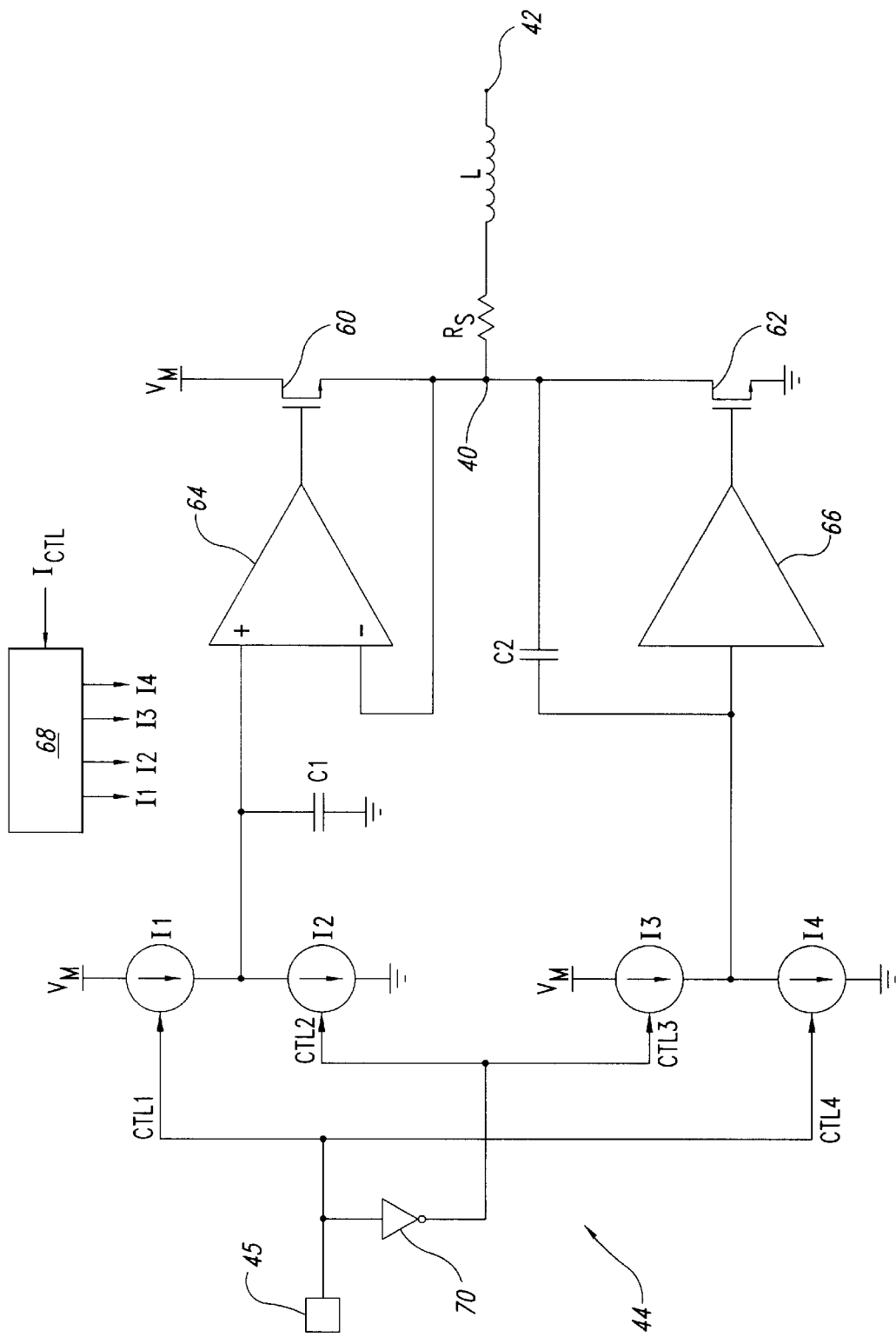
FIG. 5A is a schematic diagram of a first power amplifier including a first half of an H-bridge circuit according to the first embodiment of the invention.

The first power amplifier 44 is shown in greater detail in FIG. 5A. Again, elements common to the circuits shown in FIGS. 3 and 5A are given the same reference numerals. The first power amplifier 44 drives the PWM current into the coil L through a first half of an H-bridge circuit. The coil L and the sense resistor $R_S$ are connected in series between the first node 40 and the second node 42. The first node 40 is connected between a source of a high side driving transistor 60 and a drain of a low side driving transistor 62. A drain of the high side driving transistor 60 is connected to the voltage source $V_M$, and a source of the low side driving transistor 62 is connected to the ground. The driving transistors 60 and 62 are similar to the driving transistors 2 and 8 shown in FIG. 1.

A gate of the high side driving transistor 60 is connected to an output of an amplifier 64 which has a non-inverting input and inverting input. The inverting input of the amplifier 64 is connected to the source of the high side driving transistor 60 and to the first node 40. The non-inverting input of the amplifier 64 is connected to a first plate of a capacitor C1. A second plate of the capacitor C1 is connected to the ground. A first current source I1 is connected between the voltage source $V_M$ and the non-inverting input of the amplifier 64. A second current source I2 is connected between the non-inverting input of the amplifier 64 and the ground. A gate of the low side driving transistor 62 is connected to an output of a follower amplifier 66. An input of the follower amplifier 66 is connected to a first plate of a capacitor C2. A second plate of the capacitor C2 is connected to a drain of the low side driving transistor 62 and to the first node 40. A third current source I3 is connected between the voltage source $V_M$ and the input of the follower amplifier 66. A fourth current source I4 is connected between the input of the follower amplifier 66 and the ground.

The current sources I1, I2, I3, and I4 are connected together in a current mirror circuit 68 which receives the slew rate control signal $I_{CTL}$. The current in each one of the current sources I1, I2, I3, and I4 is equal to the current in the slew rate control signal $I_{CTL}$. Each of the current sources I1, I2, I3, and I4 is enabled by a control signal CTL1, CTL2, CTL3, and CTL4, respectively. Two of the control signals, CTL1 and CTL4, are generated by a direct connection to an output of the first PWM converter 45 such that the control signals CTL1 and CTL4 follow the first PWM signal. The first PWM signal is inverted by a digital inverter 70 having an input connected to the output of the first PWM converter 45 and an output which is connected to deliver the control signals CTL2 and CTL3. The inverter 70 inverts the first PWM signal such that the control signals CTL2 and CTL3 follow the inverted first PWM signal.

The first power amplifier 44 operates in the following manner. The first PWM signal from the first PWM converter 45 indicates whether the first node 40 is to be coupled to the voltage source $V_M$ or the ground. The rate at which the first node 40 is coupled to either the voltage source $V_M$ or the ground is governed by the slew rate control signal $I_{CTL}$.

The first PWM signal indicates which of the current sources I1, I2, I3, and I4 is to be enabled. If the first PWM signal is high then the control signals CTL1 and CTL4 enable the current sources I1 and I4, and the inverter 70 inverts the first PWM signal to produce the control signals CTL2 and CTL3 to be low which disable the current sources I2 and I3. The current source I1 charges the capacitor C1 to increase the voltage at the non-inverting input of the amplifier 64 which in turn increases the gate voltage applied to the gate of the high side driving transistor 60 to switch it on. The current source I4 discharges the capacitor C2 such that the voltage at the input of the follower amplifier 66 decreases which in turn lowers the gate voltage of the low side driving transistor 62 to switch it off. When the capacitor C1 is charged and the capacitor C2 is discharged, the first node 40 is coupled to the voltage source $V_M$ through the high side driving transistor 60. The first power amplifier 44 thereby controls direction of the PWM current driven into the coil L according to the first PWM signal. The first power amplifier 44 also controls the slew rate at the first node 40 according to the slew rate control signal $I_{CTL}$ which governs the rate at which the capacitors C1 and C2 are charged and discharged, respectively. The rate at which the first node 40 is coupled to the voltage source $V_M$ is governed by the current from the current source I1, which is equal to the current $I_{CTL}$, and which charges the capacitor C1 to switch on the high side driving transistor 60 through the amplifier 64.

If the first PWM signal is low then the control signals CTL1 and CTL4 disable the current sources I1 and I4, and the inverter 70 inverts the first PWM signal to produce the control signals CTL2 and CTL3 to be high to enable the current sources I2 and I3. The current source I2 discharges the capacitor C1 to reduce the voltage at the noninverting input of the amplifier 64, which in turn reduces the gate voltage applied to the gate of the high side driving transistor 60 to switch it off. The current source I3 charges the capacitor C2 such that the voltage at the input of the follower amplifier 66 increases, which in turn raises the gate voltage of the low side driving transistor 62 to switch it on. When the capacitor C1 is discharged and the capacitor C2 is charged, the first node 40 is coupled to the ground through the low side driving transistor 62. Again, the first power amplifier 44 controls the slew rate at the first node 40 according to the slew rate control signal $I_{CTL}$, which governs the rate at which the capacitors C1 and C2 are discharged and charged, respectively. The rate at which the first node 40 is coupled to the ground is governed by the current from the current source I3, which is equal to the current $I_{CTL}$, and which charges the capacitor C2 to switch on the low side driving transistor 62 through the follower amplifier 66.

Figure 5B:
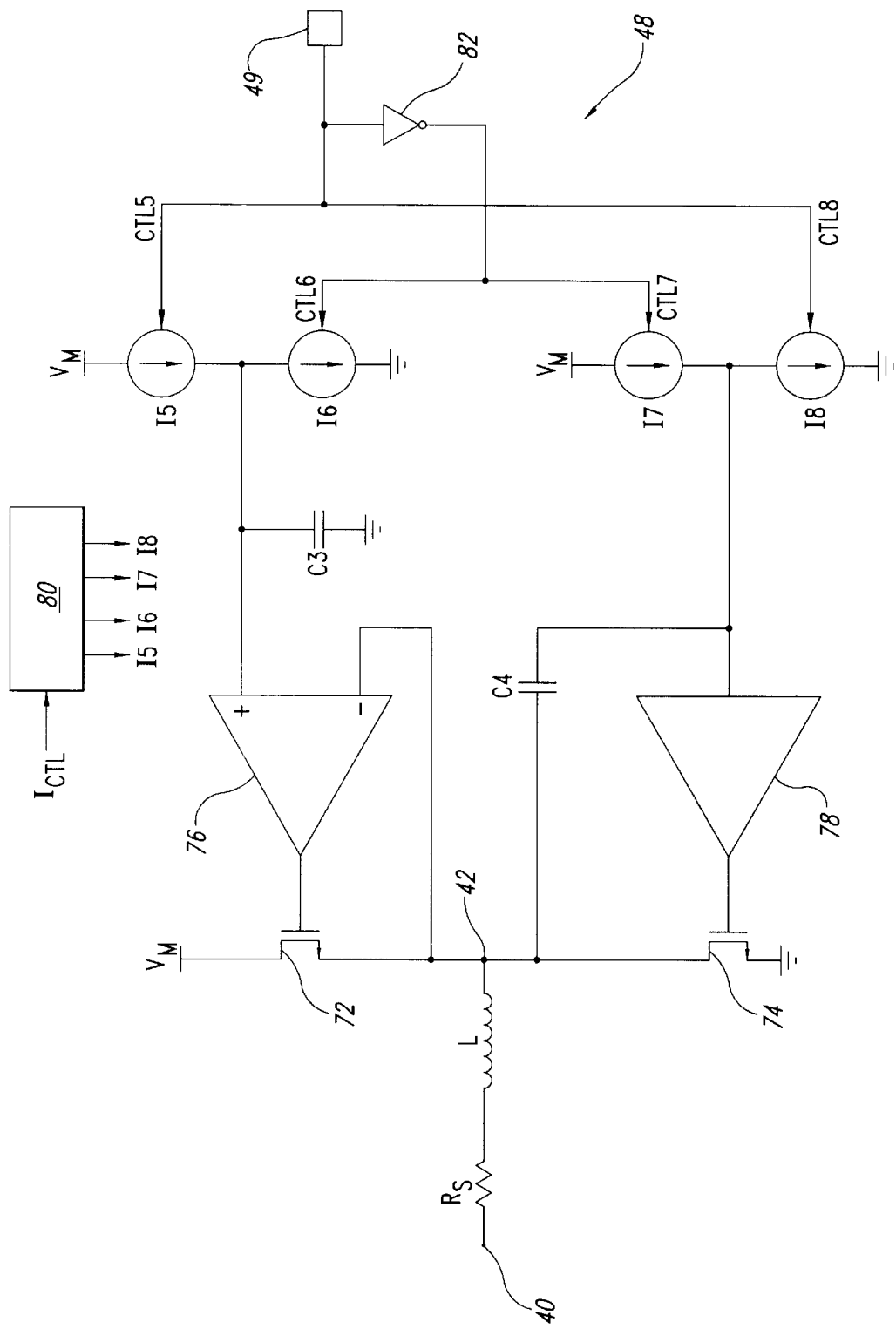
FIG. 5B is a schematic diagram of a second power amplifier including a second half of an H-bridge circuit according to the first embodiment of the invention.

The second power amplifier 48 is shown in greater detail in FIG. 5B. The second power amplifier 48 drives current in the coil L through a second half of an H-bridge circuit. The coil L and the sense resistor $R_S$ are connected in series between the first node 40 and the second node 42. The second node 42 is connected between a source of a high side driving transistor 72 and a drain of a low side driving transistor 74. A drain of the high side driving transistor 72 is connected to the voltage source $V_M$, and a source of the low side driving transistor 74 is connected to the ground. The driving transistors 72 and 74 are similar to the driving transistors 6 and 4 shown in FIG. 1.

A gate of the high side driving transistor 72 is connected to an output of an amplifier 76 which has a non-inverting input and inverting input. The inverting input of the amplifier 76 is connected to the source of the high side driving transistor 72 and to the second node 42. The non-inverting input of the amplifier 76 is connected to a first plate of a capacitor C3. A second plate of the capacitor C3 is connected to the ground. A fifth current source I5 is connected between the voltage source $V_M$ and the non-inverting input of the amplifier 76. A sixth current source I6 is connected between the non-inverting input of the amplifier 76 and the ground.

A gate of the low side driving transistor 74 is connected to an output of a follower amplifier 78. An input of the follower amplifier 78 is connected to a first plate of a capacitor C4. A second plate of the capacitor C4 is connected to a drain of the low side driving transistor 74 and to the second node 42. A seventh current source I7 is connected between the voltage source $V_M$ and the input of the follower amplifier 78. An eighth current source I8 is connected between the input of the follower amplifier 78 and the ground. The current sources I5, I6, I7, and I8 are connected together in a current mirror circuit 80 which receives the slew rate control signal $I_{CTL}$. The current in each one of the current sources I5, I6, I7, and I8 is equal to the current in the slew rate control signal $I_{CTL}$. Each of the current sources I5, I6, I7, and I8 receives a respective one of the control signals CTL5, CTL6, CTL7, and CTL8 which enable or disable the respective current sources. Two of the control signals, CTL5 and CTL8, are connected to an output of the second PWM converter 49 to receive the second PWM signal. The second PWM signal is inverted by a digital inverter 82 having an input connected to the output of the second PWM converter 49 and an output which is connected to deliver the control signals CTL6 and CTL7. The inverter 82 inverts the second PWM signal such that the control signals CTL6 and CTL7 follow the inverted second PWM signal.

The second power amplifier 48 shown in FIG. 5B operates in the following manner. The second PWM signal indicates whether the second node 42 is to be coupled to the voltage source $V_M$ or the ground. A rate at which the second node 42 is coupled to either the voltage source $V_M$ or the ground is governed by the slew rate control signal $I_{CTL}$.

The second PWM signal indicates which of the current sources I5, I6, I7, and I8 is to be enabled. If the second PWM signal is high then the control signals CTL5 and CTL8 enable the current sources I5 and I8, and the inverter 82 inverts the second PWM signal to produce the control signals CTL6 and CTL7 to be low which disables the current sources I6 and I7. The current source I5 charges the capacitor C3 to increase the voltage at the noninverting input of the amplifier 76, which in turn increases the gate voltage applied to the gate of the high side driving transistor 72 to switch it on. The current source I8 discharges the capacitor C4 such that the voltage at the input of the follower amplifier 78 decreases, which in turn lowers the gate voltage of the low side driving transistor 74 to switch it off. When the capacitor C3 is charged and the capacitor C4 is discharged, the second node 42 is coupled to the voltage source $V_M$ through the high side driving transistor 72. Again, the second power amplifier 48 also controls the slew rate at the second node 42 according to the slew rate control signal $I_{CTL}$, which governs the rate at which the capacitors C3 and C4 are charged and discharged, respectively. The rate at which the second node 42 is coupled to the voltage source $V_M$ is governed by the current from the current source I5, which is equal to the current $I_{CTL}$, and which charges the capacitor C3 to switch on the high side driving transistor 72 through the amplifier 76.

If the second PWM signal is low then the control signals CTL5 and CTL8 disable the current sources I5 and I8, and the inverter 82 inverts the second PWM signal to produce the control signals CTL6 and CTL7 to be high to enable the current sources I6 and I7. The current source I6 discharges the capacitor C3 to reduce the voltage at the non-inverting input of the amplifier 76 which in turn reduces the voltage on the gate of the high side driving transistor 72 to switch it off. The current source I7 charges the capacitor C4 such that the voltage at the input of the follower amplifier 78 increases, and the output of the follower amplifier 78 raises the gate voltage of the low side driving transistor 74 to switch it on. When the capacitor C3 is discharged and the capacitor C4 is charged, the second node 42 is coupled to the ground through the low side driving transistor 74. The second power amplifier 48 thereby controls the direction of the PWM current driven into the coil L according to the second PWM signal. The second power amplifier 48 also controls the slew rate at the second node 42 according to the slew rate control signal $I_{CTL}$ which governs the rate at which the capacitors C3 and C4 are discharged and charged, respectively. The rate at which the second node 42 is coupled to the ground is governed by the current from the current source I7, which is equal to the current $I_{CTL}$, and which charges the capacitor C4 to switch on the low side driving transistor 74 through the follower amplifier 78.

Figure 6:
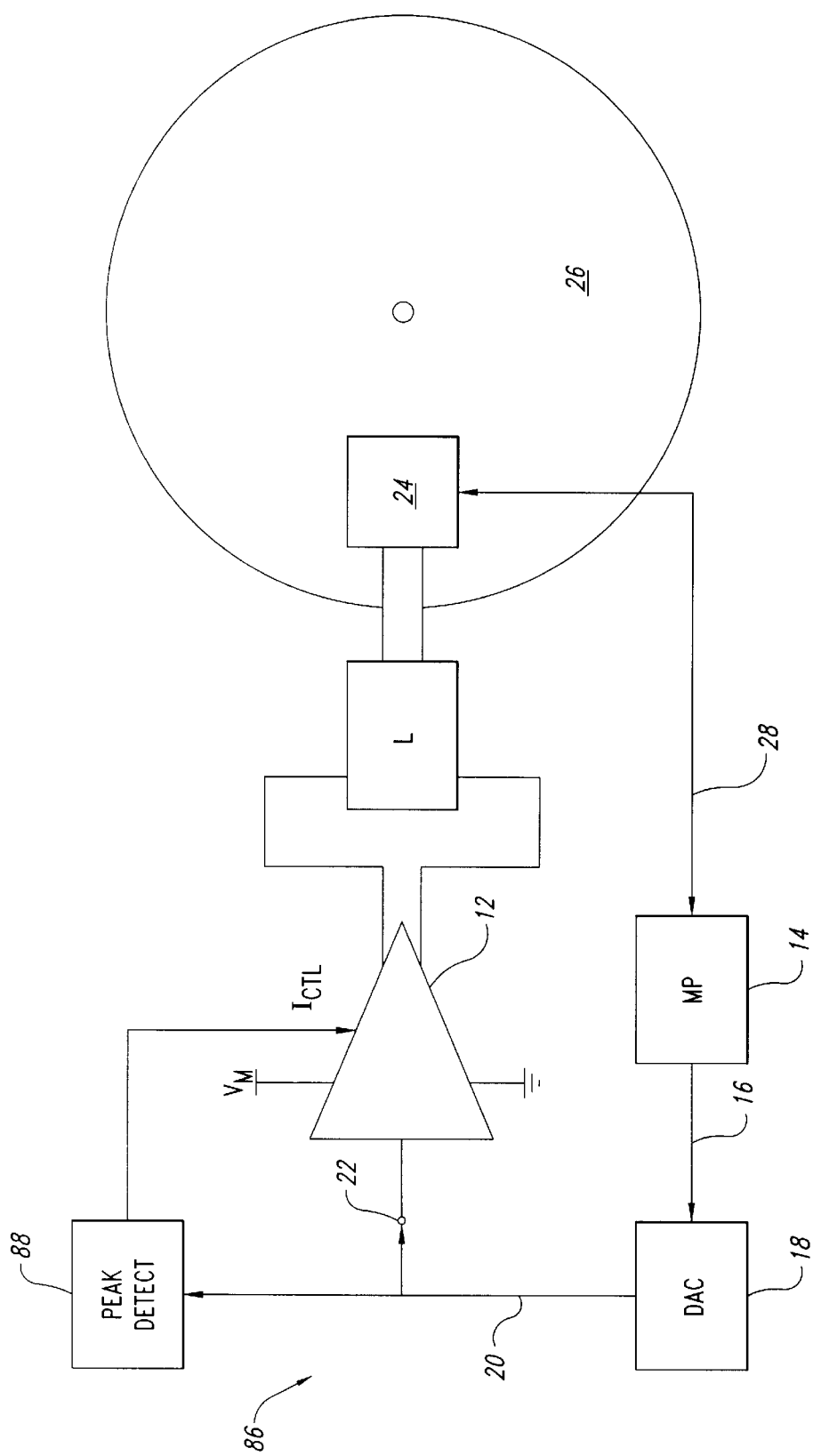
FIG. 6 is a schematic diagram of a circuit for generating a slew rate control signal according to a second embodiment of the invention.

A slew rate control circuit 86 according to a second embodiment of the invention is shown in FIG. 6. The slew rate control circuit 86 shown in FIG. 6 is similar to the slew rate control circuit 11 shown in FIG. 2, but includes a few differences. Similar elements in both figures have been given the same reference numerals.

The circuits shown in FIGS. 2 and 6 differ in the following manner. The microprocessor 14 in the slew rate control circuit 86 does not provide the slew rate control signal $I_{CTL}$ to the driver circuit 12. Instead, the analog control signal 20, indicating the direction current is to flow in the coil, is connected to an input of a peak detect circuit 88. In response to the analog control signal 20 the peak detect circuit 88 produces the slew rate control signal $I_{CTL}$. The slew rate control signal $I_{CTL}$ is then delivered to the driver circuit 12. The peak detect circuit 88 may be one of many well-known peak detect circuits. An advantage of the second embodiment shown in FIG. 6 is that the slew rate control signal $I_{CTL}$ varies continuously with the amount of current in the coil as directed by the microprocessor 14 in the analog control signal 20. For example, if there is very little current in the coil and the microprocessor 14 chooses to accelerate the coil to move the read head, the peak detect circuit 88 increases the slew rate control signal $I_{CTL}$ in direct proportion to the increase in current in the coil.

Figure 7:
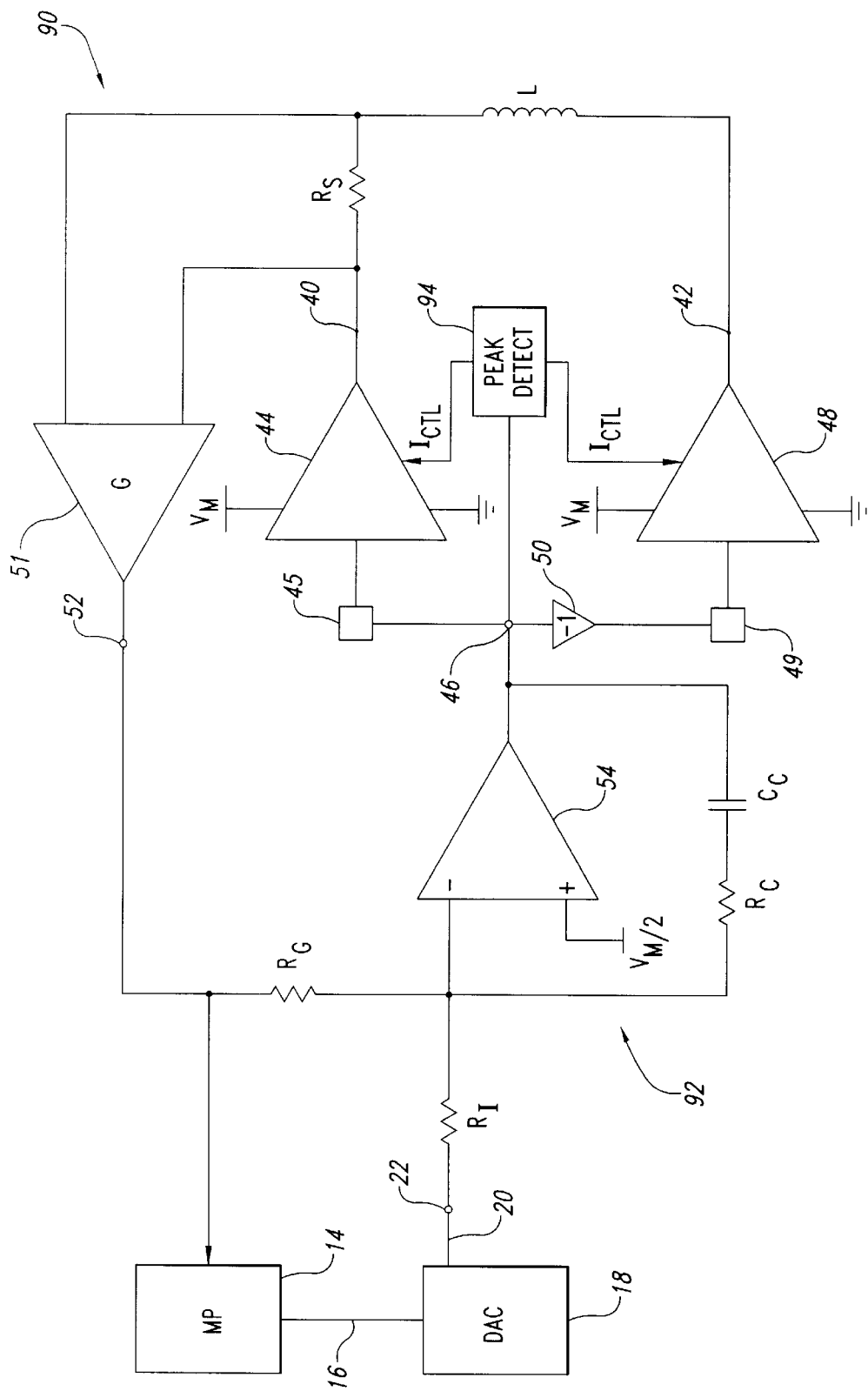
FIG. 7 is a schematic diagram of a circuit for generating a slew rate control signal according to a third embodiment of the invention.

A slew rate control circuit 90 having a driver circuit 92 according to a third embodiment of the invention is shown in FIG. 7. The slew rate control circuit 90 shown in FIG. 7 is similar to the slew rate circuit 11 shown in FIG. 3 but includes a few differences. Similar elements in both figures have been given the same reference numerals.

The circuits shown in FIGS. 3 and 7 differ in the following manner. The microprocessor 14 in the slew rate control circuit 90 does not provide the slew rate control signal $I_{CTL}$ to the driver circuit 92. Instead, the driver signal at the input terminal 46 is connected to an input of a peak detect circuit 94 which generates the slew rate control signal $I_{CTL}$ at two outputs. The slew rate control signal $I_{CTL}$ is provided to both the first and second power amplifiers 44 and 48. The peak detect circuit 94 generates the slew rate control signal $I_{CTL}$ in an analog manner in direct response to the driver signal at the input terminal 46. As described above, the driver signal indicates the difference between the instantaneous current in the coil L and the current selected by the microprocessor 14 to be driven through the coil L, and therefore the slew rate is determined by the amount of current to be driven into the coil L.

The slew rate control circuit according to the embodiments of the invention provide for a control of the slew rate and the coil of the voice coil motor based on one or more operating parameters of the disk drive system 10. The operating parameters indicate an optimal balance between the amount of noise that may be tolerated by the read/write channel 28 and the amount of power to be dissipated by the driving transistors. The slew rate may be varied continuously by an analog circuit in response to the control signal or the driver signal, as shown in FIGS. 6 and 7, respectively. As an alternative, any combination of other well known operating parameters in the disk drive system 10 may be selected as the origin of the slew rate control signal $I_{CTL}$. The slew rate control signal $I_{CTL}$ may also be generated by the microprocessor 14 shown in FIGS. 2 and 3. The microprocessor 14 controls the operation of the disk drive system 10 and may select a slew rate based on any of the operating parameters. For example, the microprocessor 14 may choose a slew rate based on whether the read head is being moved in a seek phase or a track and follow phase. The microprocessor 14 may choose a slew rate from a plurality of discrete slew rate levels which are stored in a memory, and the number of available slew rates may be optimized to maximize the performance of the disk drive system 10 and minimize the cost of the memory and the operations of the microprocessor 14.

A method and a circuit for controlling a slew rate for a coil in a voice coil motor have been described. In some instances, well-known elements such as a read/write head circuit, a spindle motor and a spindle motor driver, and a rotating disk have not been shown in detail in order not to unnecessarily obscure the invention. In addition, although several embodiments of the invention have been described above for purposes of illustration, various modifications may be made without deviating from the spirit and scope of the invention. For example, the present invention has been described as driving a coil in a voice coil motor with a PWM current in both the seek and track and follow phases. Those skilled in the art will appreciate that the present invention may be employed to drive the coil with a PWM current in conjunction with additional circuitry to drive the coil with a linear current. The conditions under which a PWM current or a linear current is used to drive the coil is a matter of design choice for one skilled in the art. The present invention has been described as driving current into the coil with a plurality of N-channel DMOS transistors in an H-bridge circuit configuration. Those skilled in the art will appreciate that other transistors, such as BJT or P-channel DMOS transistors, may be used to drive current in the coil. Those skilled in the art will also appreciate that the method and the circuit for controlling a slew rate described herein may be employed to control other types of inductive loads such as two-phase and three-phase DC motors. Numerous variations are well within the scope of this invention. Accordingly, the invention is not limited except as by the appended claims.

I claim:

1. An adaptive slew rate control circuit for controlling a slew rate of a voltage of an inductive load, the adaptive slew rate control circuit comprising:

a slew rate control circuit that produces a linear slew rate control signal based on one or more operating parameters of a system that includes the inductive load; and a driver circuit connected between a voltage supply and a reference voltage and having an input terminal, the driver circuit being coupled to the inductive load and selectively coupling the inductive load to the voltage supply in response to a driver signal received at the input terminal, the driver circuit further receiving the linear slew rate control signal from the slew rate control circuit and controlling the slew rate of the voltage of the inductive load in response to the linear slew rate control signal.

2. The adaptive slew rate control circuit of claim 1 wherein the driver circuit comprises:

a converter circuit structured to convert the driver signal into a first signal and a second signal; and first and second power amplifier circuits, each power amplifier circuit being coupled between the voltage supply and the reference voltage, the first power amplifier circuit receiving the first signal and the second power amplifier circuit receiving the second signal, the first power amplifier coupling a first end of the inductive load alternately to the voltage supply and the reference voltage in response to the first signal and the second power amplifier coupling a second end of the inductive load alternately to the voltage supply and the reference voltage in response to the second signal.

3. The adaptive slew rate control circuit of claim 2 wherein the converter circuit is a PWM converter circuit structured to convert the driver signal into a first signal and a second signal, the first signal being a PWM signal with a first duty cycle and the second signal being a PWM signal with a second duty cycle.

4. The adaptive slew rate control circuit of claim 2, further comprising:
 a sense resistor connected in series with the inductive load between the first power amplifier and the second power amplifier; and
 a differential current sense amplifier having first and second inputs and an output, the first input being connected to a first end of the sense resistor and the second input being connected to a second end of the sense resistor, the differential current sense amplifier generating a voltage at its output proportional to a current in the inductive load.

5. The adaptive slew rate control circuit of claim 4, further comprising:
 a summing amplifier having an input coupled to the output of the differential current sense amplifier and an output connected to the input terminal; and
 a control terminal coupled to the input of the summing amplifier that receives a control signal, the summing amplifier summing the control signal and the voltage from the differential current sense amplifier to generate the driver signal.

6. The adaptive slew rate control circuit of claim 4 wherein the linear slew rate control signal is a current signal, the driver circuit controlling the slew rate of the inductive load based on a combination of the current in the linear slew rate control signal and the voltage at the output of the differential current sense amplifier.

7. The adaptive slew rate control circuit of claim 1 wherein the slew rate control circuit is a microprocessor having a memory and generating the linear slew rate control signal, the linear slew rate control signal being a current signal selected by the microprocessor from a plurality of slew rate control signal levels stored in the memory.

8. The adaptive slew rate control circuit of claim 1 wherein the inductive load is included in a disk drive system having a read/write channel coupled to a microprocessor, the microprocessor including the slew rate control circuit and the selecting the linear slew rate control signal based on an error rate of the read/write channel in the disk drive system.

9. The adaptive slew rate control circuit of claim 1 wherein the inductive load is part of a disk drive system having a read head and a storage media, the read head being moved over the storage media in a plurality of phases, the slew rate control circuit selecting the linear slew rate control signal based on the phase of movement of the read head.

10. The adaptive slew rate control circuit of claim 1 wherein the slew rate control circuit is a detection circuit receiving the driver signal at an input, the detection circuit generating the linear slew rate control signal at an output in response to the driver signal.

11. The adaptive slew rate control circuit of claim 10 wherein the detection circuit is a peak detection circuit.

12. The adaptive slew rate control circuit of claim 5 wherein the slew rate control circuit is a detection circuit receiving the control signal at an input and generating the linear slew rate control signal at an output in response to the control signal.

13. The adaptive slew rate control circuit of claim 12 wherein the detection circuit is a peak detection circuit.

14. The adaptive slew rate control circuit of claim 5, further comprising:
 a microprocessor connected to the output of the differential current sense amplifier to receive the voltage therefrom and generating a digital control signal at an output; and
 a converter circuit connected to receive the digital control signal from the output of the microprocessor, the converter circuit converting the digital control signal to the linear slew rate control signal, the converter circuit being connected to provide the linear slew rate control signal to the control terminal.

15. The adaptive slew rate control circuit of claim 2 wherein each of the power amplifier circuits is comprised of:
 a terminal receiving one of the first set or second signals;
 a high side driving transistor having a control terminal and being coupled between the voltage supply and an end of the inductive load;
 an amplifier having an output connected to the control terminal of the high side driving transistor and having an input connected to a first capacitor;
 first and second current sources connected to the first capacitor, the first capacitor being charged by the first current source and discharged by the second current source in response to the driver signal to selectively couple the end of the inductive load to the voltage supply;
 a low side driving transistor having a control terminal and being coupled between the end of the inductive load and the reference voltage;
 an amplifier having an output connected to the control terminal of the low side driving transistor and having an input connected to a second capacitor; and
 third and fourth current sources connected to the second capacitor, the second capacitor being charged by the third current source and discharged by the fourth current source in response to the driver signal to selectively couple the end of the inductive load to the voltage supply.

16. An inductive motor system comprising:
 an inductive load having a first end and a second end;
 a converter circuit structured to convert a driver signal into a first signal and a second signal;
 a slew rate control circuit generating a linear slew rate control signal;
 a first driver circuit coupled between a voltage supply and a reference voltage and receiving the first signal at a first input terminal, the first driver circuit receiving the linear slew rate control signal and being coupled to the first end of the inductive load, the first driver circuit selectively coupling the first end of the inductive load to the voltage supply or the reference voltage in response to the first signal and governing a linear slew rate of a voltage of the first end of the inductive load in response to the linear slew rate control signal; and
 a second driver circuit coupled between the voltage supply and the reference voltage, the second driver circuit receiving the second signal at a second input terminal, the second driver circuit receiving the linear slew rate control signal and being coupled to the second end of the inductive load, the second driver circuit selectively coupling the second end of the inductive load to the voltage supply or the reference voltage in response to the second signal and governing a linear slew rate of a voltage of the second end of the inductive load in response to the slew rate control signal.

17. The inductive motor system of claim 16, further comprising:
   a microprocessor generating a control signal, the microprocessor coupling the control signal to a control terminal;
   a sense resistor having first and second ends and being connected in series with the inductive load between the first driver circuit and the second driver circuit;
   a differential current sense amplifier having first and second inputs and an output, the first input being connected to the first end of the sense resistor and the second input being connected to the second end of the sense resistor, the differential current sense amplifier generating a voltage at its output proportional to a current in the inductive load;
   a summing amplifier having an input and an output, the output of the summing amplifier being connected to the first input terminal of the first driver circuit and to the second input terminal of the second driver circuit, the input of the summing amplifier being coupled to the output of the differential current sense amplifier and to the control terminal to receive the control signal, the summing amplifier summing the control signal and the voltage from the output of the differential current sense amplifier to generate the driver signal.

18. The inductive motor system of claim 16 wherein the converter circuit is a PWM converter circuit structured to convert a driver signal into a first PWM signal with a first duty cycle and a second PWM signal with a second duty cycle.

19. A circuit for driving current into an inductive load, comprising:
   a driving transistor having a control terminal, a first terminal connected to a first voltage reference, and a second terminal coupled to an end of the inductive load;
   an amplifier having an input with a voltage and having an output connected to the control terminal of the driving transistor;
   a capacitor having a first plate connected to the input of the amplifier and a second plate connected to a second voltage reference;
   a first current source connected between a third voltage reference and the input of the amplifier, the first current source delivering a first current to the first plate of the capacitor, the first current having a first magnitude responsive to a first slew rate control signal; and
   a second current source connected between the input of the amplifier and a fourth voltage reference, the second current source drawing a second current from the first plate of the capacitor, the second current having a second magnitude responsive to a second slew rate control signal, the rate of change of the voltage at the input of the amplifier being controlled by a difference between the first current and the second current, the driving transistor selectively coupling the end of the inductive load to the first voltage reference in response to the voltage at the input of the amplifier.

20. A method for controlling a slew rate of a voltage of an inductive load comprising the steps of:
   providing a driver signal;
   providing a linear slew rate control signal;
   selectively coupling the inductive load to a reference voltage in response to the driver signal to drive current into the inductive load; and
   using the linear slew rate control signal to govern a rate at which the inductive load is coupled to the reference voltage, thereby controlling a rate at which the voltage of the inductive load changes in response to the linear slew rate control signal.

21. The method of claim 20 wherein the step of providing a linear slew rate control signal comprises the step of providing a current signal.

22. The method of claim 20 wherein the step of providing a linear slew rate control signal comprises the steps of:
   monitoring, by a microprocessor, a plurality of operating parameters in a disk drive system; and
   providing, by the microprocessor, a linear slew rate control signal based on one or more of the operating parameters.

23. The method of claim 22 wherein the step of providing a linear slew rate control signal comprises the step of providing a linear slew rate control signal from a plurality of discrete linear slew rate control signal levels based on one or more of the operating parameters.

24. The method of claim 20 wherein the step of providing a linear slew rate control signal comprises the step of providing a linear slew rate control signal based on an error rate of a read/write channel and a disk drive system.

25. The method of claim 20 wherein the step of providing a linear slew rate control signal comprises the step of providing a linear slew rate control signal based on a phase of movement of a read head over a storage media in a disk drive system.

26. The method of claim 20 wherein the step of providing a linear slew rate control signal comprises the step of providing a linear slew rate control signal based on the driver signal.

27. The method of claim 20 wherein the step of providing a driver signal comprises the steps of:
   sensing a current in the inductive load;
   providing a load current signal based on the current in the inductive load;
   providing a control signal;
   summing the load current signal and the control signal to provide a summed signal; and
   converting the summed signal to the driver signal which is a PWM signal with a duty cycle based on the summed signal.

28. The method of claim 27 wherein the step of providing a linear slew rate control signal comprises the step of providing a linear slew rate control signal based on the control signal.

29. The method of claim 27 wherein the step of providing a control signal comprises the steps of:
   monitoring, by a microprocessor, a plurality of operating parameters in a disk drive system; and
   generating a control signal in the microprocessor based on one or more of the operating parameters.

30. A method for driving current in a coil in a voice coil motor in a disk drive system comprising the steps of:
   monitoring a plurality of operating parameters in the disk drive system;
   providing a control signal based on one or more of the operating parameters;
   monitoring a current in the coil;
   providing a driver signal based on the control signal and the current in the coil;

converting the driver signal into a first signal and a second signal;

providing a linear slew rate control signal based on one or more of the operating parameters;

selectively coupling a first end of the coil to a first reference voltage in response to the first signal;

controlling a rate at which the first end of the coil is coupled to the first reference voltage in response to the linear slew rate control signal;

selectively coupling a second end of the coil to a second reference voltage in response to the second signal; and controlling a rate at which the second end of the coil is coupled to the second reference voltage in response to the linear slew rate control signal.

31. The method of claim 30 wherein:

the step of controlling a rate at which the first end of the coil is coupled to the first reference voltage comprises the step of controlling a first rate of change of voltage applied to a gate of a first driving transistor coupled between the first reference voltage and the first end of the coil; and the step of controlling the rate at which the second end of the coil is coupled to the second reference voltage comprises the step of controlling a second rate of change of voltage applied to a gate of a second driving transistor coupled between the second reference voltage and the second end of the coil.

32. The method of claim 30 wherein the step of providing a linear slew rate control signal comprises the steps of:

providing the driver signal to a peak detect circuit; and generating the linear slew rate control signal in the peak detect circuit in response to the driver signal.

33. The method of claim 30 wherein the step of providing a linear slew rate control signal comprises the steps of:

providing the control signal to a peak detect circuit; and generating the linear slew rate control signal in the peak detect circuit in response to the control signal.

34. A method for driving current into an inductive load comprising the steps of:

applying a gate voltage to a gate of a driving transistor coupled between a first voltage and the inductive load;

supplying a first current to a first plate of a capacitor to raise the voltage of the first plate of the capacitor, the first current having a first magnitude responsive to a first control signal;

withdrawing a second current from the first plate of the capacitor to lower the voltage of the first plate of the capacitor, the second current having a second magnitude responsive to a second control signal;

coupling the first plate of the capacitor to the gate of the driving transistor such that the gate voltage is provided by the first plate of the capacitor; and controlling the gate voltage according to a difference between the first current and the second current to render the driving transistor conductive to couple the first voltage to the inductive load.

35. The inductive motor system of claim 17, wherein the microprocessor includes a slew rate control circuit and a memory storing a plurality of discrete slew rate control signal levels, the microprocessor receiving a plurality of operational parameters from the inductive motor system and selecting a linear slew rate control signal from the discrete slew rate control signal level stored in the memory based on one or more of the operational parameters, the microprocessor coupling the linear slew rate control signal to inputs to the first driver circuit and to the second driver circuit.

* * * * *